W. S. REFSNIDER.
MOLD FOR HOLLOW CONCRETE BLOCKS.
APPLICATION FILED DEC. 28, 1914.
1,181,035.
Patented Apr. 25, 1916.
2 SHEETS—SHEET 1.
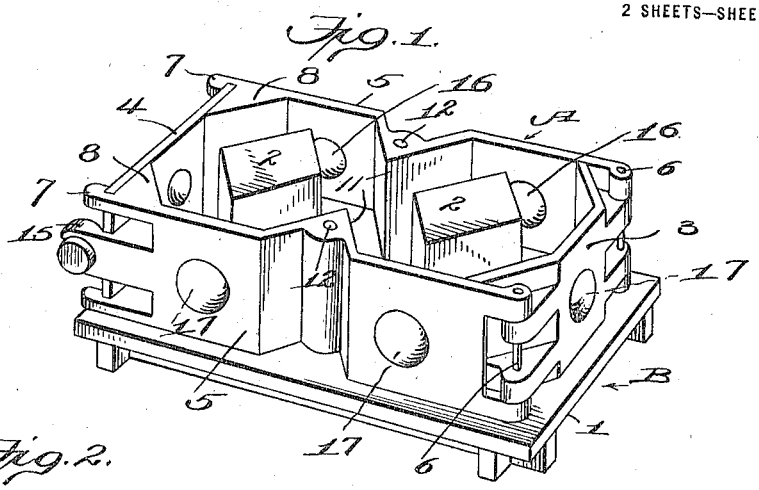
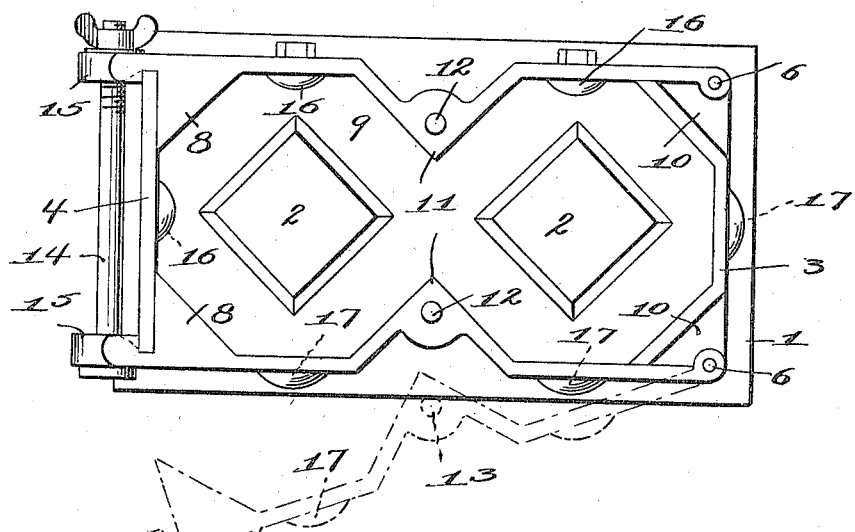
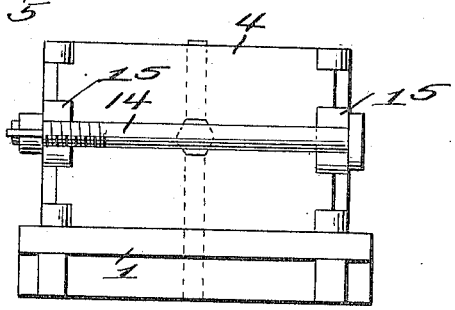
Witnesses:
Inventor
Winfield S. Refsnider
by
James L. Norris
Attorney W. S. REFSNIDER.
MOLD FOR HOLLOW CONCRETE BLOCKS.
APPLICATION FILED DEC. 28, 1914.
1,181,035.
Patented Apr. 25, 1916.
2 SHEETS—SHEET 2.
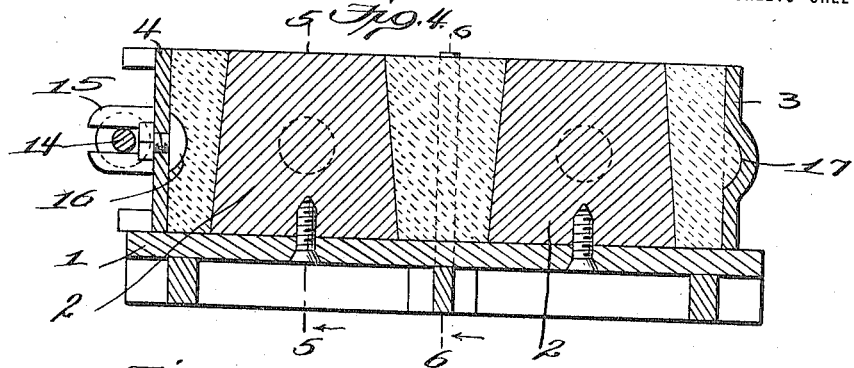
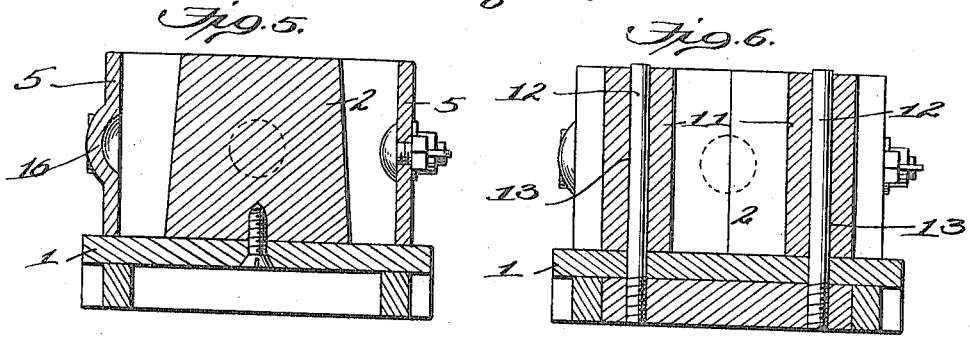
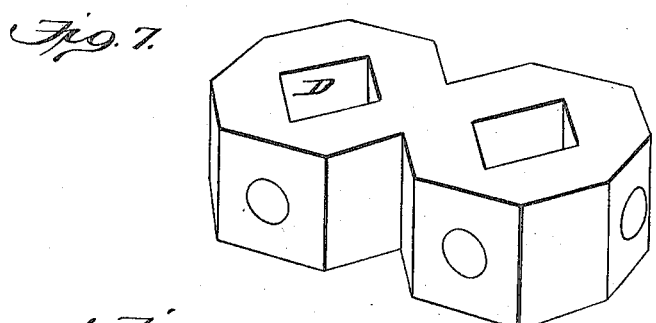
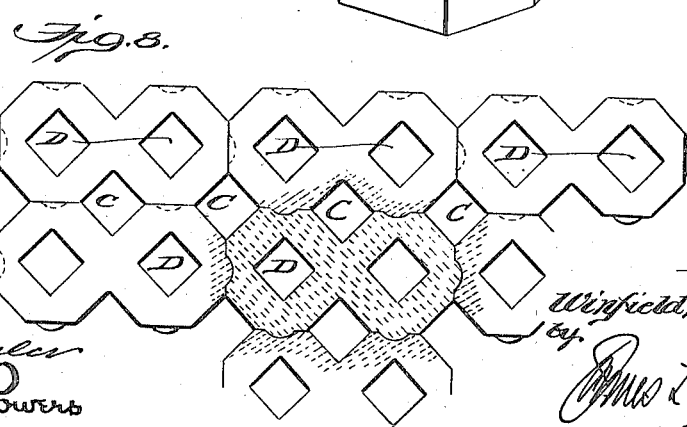
Witnesses
C. A. Kesler
John S. Powers
Inventor
Winfield S. Refsnider
by
James L. Norris
Attorney
THE COLUMBIA PLANOGRAPH CO., WASHINGTON, D. C.

UNITED STATES PATENT OFFICE.

WINFIELD S. REFSNIDER, OF CHARLES CITY, IOWA.

MOLD FOR HOLLOW CONCRETE BLOCKS.

1,181,035. Specification of Letters Patent. Patented Apr. 25, 1916.

Application filed December 28, 1914. Serial No. 879,376.

*To all whom it may concern:*

Be it known that I, WINFIELD S. REFSNIDER, a citizen of the United States, residing at Charles City, in the county of Floyd and State of Iowa, have invented new and useful Improvements in Molds for Hollow Concrete Blocks, of which the following is a specification.

This invention relates to improvements in molds for hollow concrete blocks.

The principal objects of the invention are to provide a mold wherein the mold body and pallet may be readily connected and disconnected; wherein the mold body will always be accurately centered relatively to the pallet; wherein the mold body when assembled upon the pallet will be efficiently reinforced by the connections which hold the mold body in position; wherein the molded block may be removed from the pallet with the mold body and will be positively supported by said body and, hence, readily handled and carried about without liability of displacement and consequent breakage; and wherein the elements which serve to positively support the molded block from the mold serve the further purpose of forming recesses and projections in the block whereby the blocks, when laid in a course, have an interlocking relation; and to provide a mold which, while efficiently serving the objects above set forth, shall be of simple, inexpensive, and durable construction.

An embodiment of the invention is illustrated in the accompanying drawings, wherein:—

Figure 1 is a perspective view of a mold in which the features of the invention are incorporated; Fig. 2 is a top plan view thereof; Fig. 3 is a front elevation thereof; Fig. 4 is a central longitudinal sectional view thereof, (showing also the molded product); Figs. 5 and 6 are cross-sectional views, respectively, on the lines 5—5 and 6—6 of Fig. 4; Fig. 7 is a perspective view of a block produced by the mold; and Fig. 8 is an elevation, partly in section, of a portion of a wall made up of the blocks shown in Fig. 7.

Similar characters of reference designate corresponding parts throughout the several views.

The improved mold comprises a mold body A and a pallet B, the latter being of ordinary form and consisting of a plate 1, which supports the concrete during the molding operation, provided with upright cores 2, the shape of which is selected to accord with the individual choice but which in any event are preferably of upwardly tapering form. As shown, the cores 2 are of frusto-pyramidal form.

The mold body A comprises end walls 3 and 4 and side walls 5. The side walls 5 are hinged along vertical axes, as at 6, to the end wall 3, and at their front ends are provided with hook-like lugs 7 to engage over and retain the end wall 4, the latter, of course, being removable. The end wall 4 is confined between the lugs 7 and abutments 8 provided at the inner sides of the walls 5 adjacent the lugs 7 and serving not only for the retention of the end wall 4 but also to define the mold space 9 in conformity to the adjacent core 2. Abutments 10 generally similar to the abutments 8 are provided at the ends of the end wall 3 and the abutments 10 serve to define the mold space 9 in conformity to the adjacent core 2, and also to limit the inward movement of the walls 5 about their hinges 6. The side walls 5 are preferably provided with intermediate abutments 11. By virtue of the abutments 8, 10 and 11, the edge faces of the block are so formed that when the blocks are laid to form a wall, openings C are provided at intervals intermediate the mating edge faces, the said openings C being of the same general form and dimensions as the openings D formed in the body of the blocks by the cores 2. The abutments 8, 10 and 11 while employed in the preferred embodiment of the invention, may, if desired, be omitted or modified as choice may dictate.

The operative connection of the mold body and the pallet is effected by a pair of upright pins 12 arranged at opposite sides of the pallet and which engage in openings 13 provided therefor in the side walls 5. The pins 12 tend to spring inwardly and their upper ends, when the pallet is free of the mold body, have slightly less spacing than the openings 13; wherefore, when said pins are engaged in said openings, they bind frictionally against the inner sides of the openings and thus serve to hold the mold body with sufficient force to prevent its accidental displacement from the pallet. The pins 12 not only hold the mold body upon the pallet, but they also hold the side walls 5 in operative relation to one another and against outward displacement. For the purpose of holding the walls 5 against outward displacement when the mold body is removed from the pallet, a connecting bolt 14 is employed, the said bolt being fitted in slotted ears 15 provided at the front ends of the side walls 5 and coplanar with said side walls, the head of the bolt engaging at the outer side of one of said ears and the nut at the opposite end of the bolt engaging at the outer side of the other ear.

One of the side walls 5 is provided on its inner face with projections 16 and a similar projection is provided upon one of the end walls, e. g. upon the end wall 4. The other side wall 5 and the end wall 3 are provided on their inner faces with recesses 17 conforming in shape to the projections 16. The said projections 16 are preferably of convex spheroid form and the recesses 17 are correspondingly concave. The projections 16 and recesses 17 may be arranged in any suitable manner, but they are preferably arranged opposite the outer apices of the cores 2. The projections 16 and recesses 17 serve a double purpose. One purpose served by said projections and recesses is to form corresponding recesses and projections at opposite sides and ends of the block, the projections of one block fitting in the recesses of adjacent blocks when the blocks are laid in course, as shown in Fig. 8. The second purpose of the projections 16 and recesses 17 is to establish an interlocking connection between the block and the mold body whereby the block and the mold body may be removed as a unit from the pallet and the block may be positively supported from said body when the latter is removed from the pallet. In this way, the block may be readily carried from place to place with no liability of its becoming displaced from the mold body.

In use, the pallet and mold body are first fitted together, the pins 12 being sprung apart to permit their introduction into the openings 13, and the nut on the bolt 14 being tightened sufficiently to prevent any outward displacement of the side walls 5 when the mold body is removed from the pallet. The concrete is introduced into the mold space 9 and the block is molded in the usual way. After the concrete has become sufficiently set, the mold body and the block are removed as a unit from the pallet. The pins 12 bear with sufficient force against the inner sides of the openings 13 to prevent accidental displacement of the mold body from the pallet but they do not interfere with the intentional separation of the mold body and the pallet when the occasion may require. After the mold body and the block have been removed from the pallet in the manner described, the mold body is positioned upon a suitable support for holding the mold block and thereupon the nut on the bolt 14 is loosened sufficiently to permit the removal of said bolt from the ears 15, at which time the side walls 5 may be moved outwardly on their hinges. The mold being thus dismantled, it is freed from the block and ready for re-use.

The pins 12, in addition to retaining the mold body upon the pallet, also insure of the accurate centering of said body upon said pallet and provide a substantial reinforcement for the walls 5 during the molding operation. The pyramidal form of the cores 2 insures of the ready disassociation of the mold body and the mold block from the pallet when the concrete has become sufficiently hard to permit of the removal of the block.

Having fully described my invention, I claim:—

1. A mold for concrete blocks comprising a pallet, a mold body comprising end and side walls, the latter being hinged to one of the end walls and the other end wall being removably fitted to the side walls, means connecting the side walls to hold them against outward displacement and operable to release said side walls and upright pins arranged at opposite sides of the pallet, the side walls having openings therethrough for said pins and the latter engaging frictionally in said openings.

2. A mold for concrete blocks, comprising a pallet, a mold body composed of side and end walls adapted to be dismantled to release the molded block, means for holding said walls in operative relation, upright pins provided on said pallet, opposite walls of said mold body having openings therethrough for said pins, the latter engaging frictionally in said openings and means provided on the walls of said mold body for interlocking the molded product and the assembled mold body.

3. A mold for concrete blocks, comprising a pallet, a mold body composed of side and end walls adapted to be dismantled to release the molded block, means for holding said walls in operative relation, upright pins provided on said pallet, opposite walls of said mold body having openings therethrough for said pins, the latter engaging frictionally in said openings and projections provided on certain walls of said mold body, the other walls having recesses conforming to said projections, said projections and recesses serving to form interlocking recesses and projections respectively on the molded block and to interlock the molded block and the assembled mold body.

4. A mold for concrete blocks comprising a pallet and a mold body composed of side and end walls, the side walls being hinged to one of the end walls and having hook-like lugs at their free ends and abutments at their inner sides adjoining said lugs, the end wall to which the side walls are hinged having similar abutments which limit the inward movement of the side walls about their hinges, the other end wall being removably fitted between said lugs and said side wall abutments and means for holding the side walls against outward displacement when the mold body is removed from the pallet but operable to release said side walls.

5. A mold for concrete blocks comprising a pallet and a mold body composed of side and end walls, the side walls being hinged to one of the end walls and having hook-like lugs at their free ends and abutments at their inner sides adjoining said lugs, the end wall to which the side walls are hinged having similar abutments which limit the inward movement of the side walls about their hinges, the other end wall being removably fitted between said lugs and said side wall abutments and means for holding the side walls against outward displacement when the mold body is removed from the pallet but operable to release said side walls, said abutments serving in combination with the end and side walls to define the mold space and insuring that the blocks, when laid in course, shall have openings at intervals therebetween.

In testimony whereof I have hereunto set my hand in presence of two subscribing witnesses.

WINFIELD S. REFSNIDER.

Witnesses:
  E. W. HOLBROOK,
  H. ELSIE CALVERT.

Copies of this patent may be obtained for five cents each, by addressing the "Commissioner of Patents, Washington, D. C."